United States Patent [19]

Smith et al.

[11] Patent Number: 5,087,124
[45] Date of Patent: Feb. 11, 1992

[54] INTERFEROMETRIC PRESSURE SENSOR CAPABLE OF HIGH TEMPERATURE OPERATION AND METHOD OF FABRICATION

[76] Inventors: Rosemary L. Smith; Scott D. Collins, both of 3311 Oyster Bay Ave., Davis, Calif. 95616

[21] Appl. No.: 349,231

[22] Filed: May 9, 1989

[51] Int. Cl.⁵ .............................................. G01B 9/02
[52] U.S. Cl. ................................. 356/358; 250/227.27
[58] Field of Search ............................. 356/345, 358; 250/227.17, 231.19, 227.27

[56] References Cited

U.S. PATENT DOCUMENTS 4,926,696  5/1990  Haritonidis et al. ............ 356/358 X

OTHER PUBLICATIONS

Young et al., TH0215-4/88/0000-0019 (1988).
L. P. Bovin, *Applied Optics*, 13(2), 391-95 (1974).
K. E. Petersen, *Proceedings of the IEEE*, 70(5), 420-57 (1982).
E. Bassous, *IEEE Trans. on Elect. Dev.*, ED-25(10), 1178-84 (1978).
M. Hirata, et al., *Sensors and Actuators*, 13, 63-69 (1988).
K. Bean, *IEEE Trans. on Elect. Dev.*, ED-25 (10), 1185-93 (1978).
A. Reisman et al., *J. Electrochem. Soc.*, 126(8), 1406-15 (1979).
W. H. Ko et al., *Micromachining and Micropackaging of Transducers*, (Elsevier Science Publication, Holland 1985).
K. E. Petersen et al., *IEEE Solid-State Sensor and Actuator Workshop*, Hilton Head, S.C., 144-147 (Jun. 1988).
L. S. Fan et al., *Transducers* 87, 849-52 (1987).
E. W. Saaski et al., *Fiber Optic and Laser Sensors V*, SPIE, vol. 838, 46-48 (1987).
M. T. Velluet et al., *Fiber Optic and Laser Sensors V* SPIE, vol. 838, 78-83 (1987).
K. L. Belsley et al., *InTech* 39-42 (Dec. 1986).
G. Beheim et al., *Rev. Sci. Instrum.*, 58(9), 1655-59 (1987).
D. Uttamchandani et al., *Electronic Letters*, 23(4), 152-53 (1987).
R. A. Lieberman et al., *Fiber Optic Laser Sensors V*, SPIE Vol. 838, 49-59 (1987).
R. M. White et al., *Sensors and Actuators*, 13(4), 391-95 (1988).

*Primary Examiner*—David L. Willis
*Assistant Examiner*—Matthew W. Koren
*Attorney, Agent, or Firm*—Kilpatrick & Cody

[57] ABSTRACT

An interferometric-based pressure transducer is fabricated from two layers of silicon having different crystal orientations which have been processed using selective anisotropic etching to produce in one silicon layer a mirror surface and a groove that is aligned with the mirror, and a pressure-responsive membrane in the other layer. The layers are joined with the membrane opposite the mirror, and an optical fiber is secured in the groove so that light from the optical fiber is conveyed by the mirror surface between the membrane and the optical fiber. Conventional interferometric apparatus compares transmitted and received light in order to sense deformation of the membrane and thereby sense pressure.

14 Claims, 2 Drawing Sheets

INTERFEROMETRIC PRESSURE SENSOR CAPABLE OF HIGH TEMPERATURE OPERATION AND METHOD OF FABRICATION

BACKGROUND OF THE INVENTION

This invention relates to interferometric-based optical micro-pressure transducers and methods of fabrication of such pressure sensors.

Most commercially available micro-pressure sensors utilize piezoresistive or capacitive transduction mechanisms to sense pressure. These mechanisms quantify the deflection of a pressure deformable membrane by measuring either a change in resistance induced by membrane strain or a change in capacitance between the membrane and a stationary plate.

Recently, an interferometric-based transduction mechanism has been disclosed in which pressure deformation of a membrane is measured optically by reflecting coherent light from the surface of the membrane and measuring the change in the optical path length using classic Fabre-Perot (Mach-Zender) interferometric techniques. Young, et al., "A Twin-Interferometer Fiber-Optic Readout for Diaphragm Pressure Transducers," TH0215-4/88/0000-0019. Single mode fiber optic wave guides are essential components of these transducers to direct the coherent light to and from the membrane and essentially serve as the "arms" of the interferometer.

FIG. 1 schematically illustrates the basic form of such a sensor. An organic encapsulant material secures one end of an optical fiber in an opening through a fiber housing material so that the fiber end is fixed an appropriate distance from a membrane formed by etching of silicon, and the silicon is joined to the fiber housing so that the membrane is positioned opposite the end of the fiber.

Interferometric-based transduction offers many potential advantages over present piezoresistive and capacitive pressure sensors, not the least of which are increased sensitivity and the ability to function at elevated temperatures, i.e. in excess of 300° C. However, despite these potential advantages, a commercially viable sensor has yet to be realized. This is primarily a result of technical problems in joining fiber optic waveguides to other sensor components such as the membrane and the associated fiber optic housing. For example, the optical components, i.e. the fiber and pressure transduction membrane, must be carefully aligned and rigidly fixed with respect to each other in order to operate effectively and eliminate spurious displacements. Although the fabrication of the membrane itself is usually performed using high precision (<1 μm) photolithography and three dimensional anisotropic etching of single crystal silicon, present assembly and packaging techniques for interferometric pressure sensors rely upon conventional or custom machined fiber optic packaging fixtures with tolerances of 1 to 0.5 mils (25 to 12.5 microns). In addition, alignment and assembly of the sensor components are performed manually, and encapsulation is limited to the application of simple organic adhesives which are not suited to high temperature operation. If the special advantages of the interferometric pressure sensors are to be realized and effectively compete with present IC based technologies in the pressure sensor market, an easily automated fabrication process which provides reliable and inexpensive optical alignment, assembly and packaging must be found.

Several different fiber optic interconnect technologies already exist. For instance, the telecommunication industry has developed precise techniques for mounting, positioning and aligning optical fibers to themselves and to external components such as electronic circuits. However, these techniques are usually intended for limited, high precision use, and are not generally suited to inexpensive automation. Additional techniques for the interfacing of optical cables to planar, monolithic waveguide are available. These techniques use photolithography and anisotropic silicon etching to define high precision alignment grooves in the silicon surface. Optical cables can then be easily and accurately placed in the alignment grooves and permanently bonded as needed. These photolithography and anisotropic silicon etching techniques are, taught, for instance, in L. P. Bovin, "Thin Film Laser to Fiber Coupler," *Applied Optics*, 13(2), 391-395 (1974), which are incorporated herein by reference.

This interconnect technology is attractive for use in producing an interferometric pressure sensor; however, the geometry of a planar interconnection presents problems in properly addressing the optical beam to the membrane surface. It would be more preferable to be able to steer the optical beam in any desired direction, not just horizontally or vertically.

It is therefore an object of the present invention to provide a new transducer geometry superior to the geometry utilized in previous interferometric pressure transducer structures.

It is a further object of the present invention to provide an interferometric pressure transducer structure which can withstand high temperatures.

It is another object of the present invention to provide improved techniques for fabricating interferometric pressure transducers and sensors, allowing them to be economically produced in large quantities utilizing existing technologies.

It is still another object of the present invention to provide methods for fabricating interferometric pressure transducers and sensors, and other such devices, using inexpensive and accurate groove-pin-groove alignment techniques.

SUMMARY OF THE INVENTION

These objects are achieved in an interferometric-based pressure transducer fabricated using silicon selected for specific crystal orientations to allow cutting and polishing or etching of the surfaces relative to each other to create reflective surfaces transmitting the light between the fiber optic and the pressure sensitive membrane. By selecting silicon having a specific crystal orientation, such as {410} which has an orientation of 45° with respect to the {111} planes, in combination with silicon having another specific orientation, such as {100} which has an orientation of 54.7° with respect to the {111} planes, a configuration can be achieved which conveys light directly between an optic fiber positioned in almost any direction relative to the sensing membrane and the sensing membrane. Conventional techniques such as anisotropic etching are used to form the desired surfaces, as well as grooves or steps for alignment of the structures and optic fiber, thereby overcoming many of the problems of the fabrication and alignment of the prior art transducers.

In the example provided of the construction of an interferometric pressure sensor, a {410} silicon wafer is anisotropically etched to provide alignment grooves for an optical fiber and to create a reflective surface in the {410} silicon layer. A {100} silicon wafer is anisotropically etched to provide complementary alignment grooves for the optical fiber and to create a pressure sensitive membrane. The alignment grooves and crystal orientation of the silicon are designed so that the fiber can be secured between the two layers of silicon with the fiber end precisely held adjacent to the reflective surface in the {410} silicon layer and opposite the membrane formed in the {100} silicon layer.

DETAILED DESCRIPTION OF THE INVENTION

In contrast to the prior art methods for making an interferometric pressure microsensor, the sensor and fabrication method described herein are economical and suitable for simultaneous batch processing of a number of units. The structure and fabrication technique of the present invention address the problems of fiber optic to membrane housing interconnect with a simple process and assembly flow which draws from well known integrated circuit fabrication technology and three dimensional silicon anisotropic etching techniques. These techniques are generally described, for example, in Petersen, "Silicon as a Mechanical Material," Proceedings of the IEEE, Vol. 70, No. 5, (May 1982). The optical cabling and sensor housing are interfaced in such a fashion so as to take advantage of existing silicon and fiber optic interconnect technologies.

These combined technologies facilitate the fabrication and assembly of precisely aligned optical interconnections as a packaged unit of viable geometry for the functioning of the pressure transducer. The individual components of the membrane housing are fabricated on separate silicon wafers using high precision photolithography and anisotropic silicon etches. The individual components are then aligned and assembled at the wafer level to produce a housing package complete with membrane and alignment groove for easy and simple attachment of the optical fibers.

A key element in this process is the design and fabrication of the silicon structures which include an optical mirror directing the output of the fiber optic waveguide towards the membrane surface at the proper angle of incidence, for example, normal to the membrane surface. Use of a mirror effectively eliminates all of the obstacles encountered in using standard technologies for the fabrication of the membrane and fiber optic interconnects. The mirror is used to couple the optical beam from the output of the fiber optic waveguide to the membrane and back again despite their unfavorable relative orientations.

Figure 1:
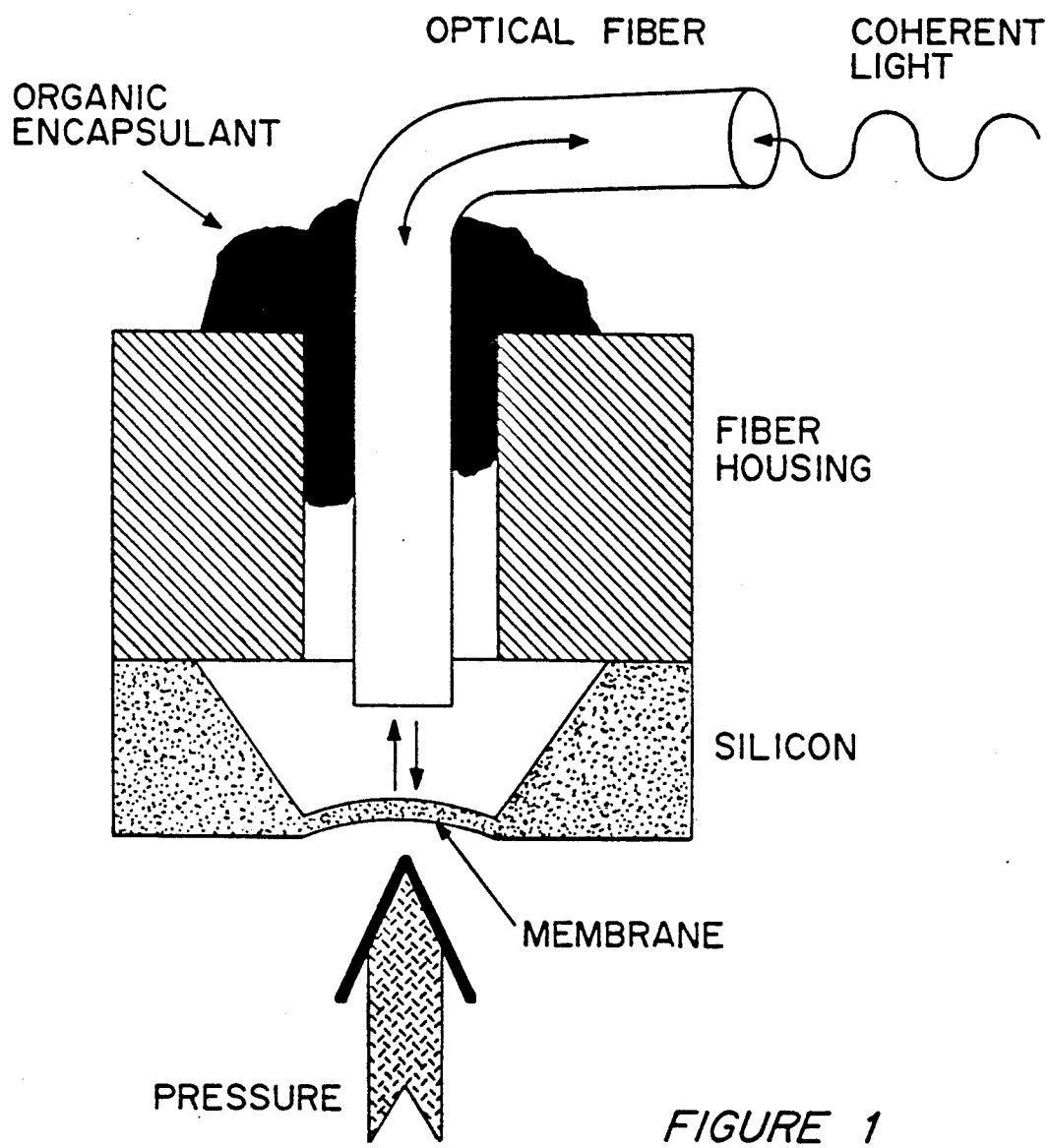
FIG. 1 is a schematic elevational view, partially in section, of an interferometric pressure transducer constructed in accordance with the prior art.
Figure 2:
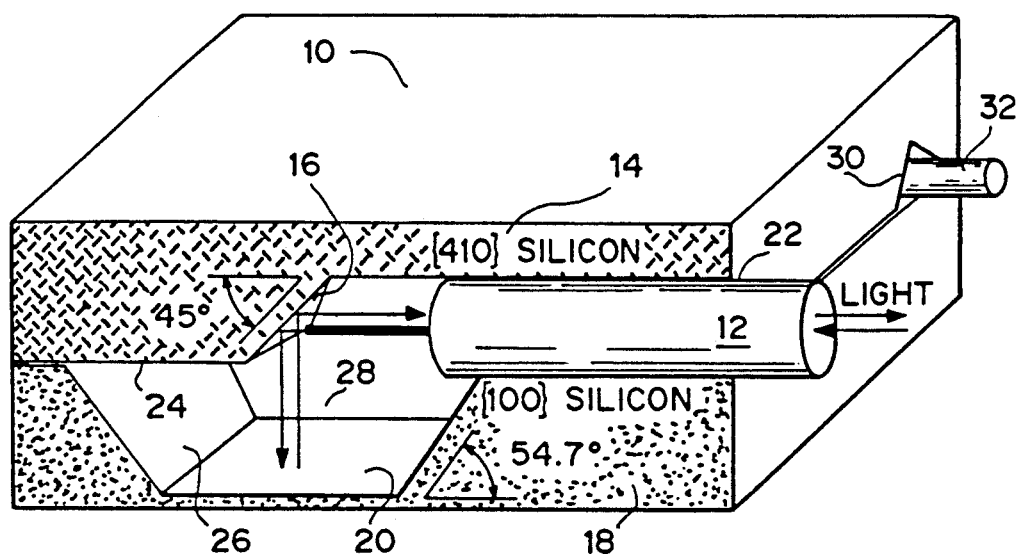
FIG. 2 is a schematic elevational view, partially in section, of the pressure transducer of the present invention.

FIG. 2 illustrates an interferometric pressure transducer or sensor 10 in accordance with the present invention having an optical fiber 12 sandwiched between {410} silicon layer 14 with optical mirror surface 16 and {100} silicon layer 18 with pressure sensitive membrane 20. Fiber 12 is maintained in accurate alignment and position with respect to mirror surface 16 because it rests in a groove 22 in the inner surface 24 of {410} and/or {100} silicon layer 14. The end of optical fiber groove 22 is sealed to provide an inner chamber with a fixed "reference" pressure.

The pressure membrane 20 on {100} silicon layer 18 is fabricated using conventional techniques known to those skilled in the art. For example, the thickness of membrane 20 can be accurately controlled by using time etches or a number of well known etch-stop techniques. Fiber optic alignment grooves can also be etched into the {100} wafer 18 at the same time. Techniques include those described by E. Bassous, "Fabrication of Novel Three-Dimensional Microstructures by the Anisotropic Etching of {100} and {110} silicon," IEEE Trans. on Elect. Dev., ED-25(10), 1178 (1978); and M. Hirata, K. Suzuki and H. Tanigawa, "Silicon Diaphragm Pressure Sensors Fabricated by Anodic Oxidation Etch-Stop," *Sensors and Actuators*, 13, 63 (1988). Bassous describes general anisotropic etching and gives a few membrane examples. The membranes are made by knowing the etch rate and timing the etch or stopping on a heavily doped p or n silicon layer. Most anisotropic etches will not etch p or n silicon that is doped to concentrations greater than about $10^{19}$ to $10^{21}$ atoms/cc respectively. It can therefore be used as a precisely defined etch stop. Hirata, et al., describe the formation of a membrane by etch stop at a reversed biased pn diode junction (called anodic etch stop).

Anisotropic etches for silicon rely upon the selective dissolution of silicon along specific crystal planes, as disclosed in Bassous (above), K. Bean, "Anisotropic Etching of Silicon," IEEE Trans. on Elect. Dev., *ED*025(10), 1185 (1978); A. Reisman, et al., "The Controlled Etching of Silicon in Catalyzed Ethylenediamine-Pyrocatechol-Water Solutions," *J. Electrochem. Soc.*, 126(8), 1406 (1979). For photolithography and general processing see "Silicon Processing for the VLSI Era, Volume I-Process Technology," S. Wolf and R. N. Tauber, Lattice Press, Sunset Beach, Calif., 1987, and also "VLSI fabrication principles: Silicon and Gallium Arsenide," S. K. Ghandi, John Wiley and Sons, New York, 1983. Silicon having a number of different crystal orientations have been described. For example, as listed in Table 2-1 of X-ray Crystallography.

An example of the selective dissolution of silicon along specific crystal planes is further understood with reference to {100} and {111} silicon. Generally, etching in the {111} direction is extremely slow while the {100} and {110} crystallographic directions etch more rapidly. Using this inherent selectivity, three-dimensional microstructures can be precisely and reproducibly formed in silicon utilizing standard surface photopatterning and masking. However, since the {111} crystal planes represent a terminal etch plane, the etch relief of the microstructures is governed by the {111} crystal plane angle of intersection with each other and the silicon surface. With respect to fabricating the membrane 20 on the {100} silicon layer 18, the sides 26 of the etch pit 28 are the {111} crystal planes and form an angle of 54.7° with respect to the {100} crystal plane, which parallels the membrane surface 20. Of particular importance in the design of the interferometric pressure sensor mirror 16 is the selection of that crystalline orientation which places the {111} crystal planes at exactly the desired angle with respect to the membrane surface.

This particular angle is approximately represented by {410} crystal oriented wafers which have {111} planes at 45.56° with respect to the surface. Using this crystal orientation, anisotropic etches may be used to fabricate a reflection mirror to couple the horizontally directed light beam from the fiber optic interconnect downward toward the membrane surface.

The fiber groove can be etched into only one wafer or both of the wafers. Preferably, the groove is etched into both wafers, but to different depths. A single mode optical fiber is typically 100 to 200 microns in diameter. The light travels through the center 2 to 4 microns of the fiber, with the remainder serving as cladding, based on differences in refractive light indices, to confine the light within the 4 micron center. Although dependent on the total diameter of the fiber, the effective depth of the groove and the aperture of the fiber, as long as the groove in the bottom wafer is shallow, the light in the center is still directed towards the mirror. Using grooves in both wafers not only more accurately and firmly holds the fiber in position but assists in the alignment of the two wafers.

Precise (approximately $\pm 3$ $\mu$) alignment of the two wafers is accomplished mechanically without the aid of optical aligners by etching into both wafers complimentary alignment slots or grooves at the same time the mirror and membrane are formed. Precision pins or cylinders such as sections of optical fibers are placed into the alignment slots of one wafer, and the second wafer is moved over the first wafer until the pins or cylinders match the slots in the second wafer. At least two grooves, and most preferably more than two grooves, are etched into the silicon wafers at right angles to each other for alignment in both the x direction and the y direction. Additional grooves used exclusively for alignment can be independently placed almost anywhere on the wafer and need not be part of the product after bonding and dicing. Alternatively, a mesa can be etched into one wafer and a complementary hole or groove etched into the other wafer.

After bonding, the completed two-wafer structure is then diced into the individual sensors 10. The fiber optic waveguides can then be easily inserted into the exposed alignment grooves and bonded into place using silicate adhesives or other appropriate bonding techniques, preferable utilizing materials and techniques able to withstand substantial temperatures in order to insure that the full high-temperature tolerance attributes of the sensor of the present invention are realized.

The two wafers and the fiber optic are aligned and bonded together, and the end of the fiber optic into the pressure chamber sealed, using any of a number of available methods such as anodic bonding, reactive sealing, fusion bonding, or silicate adhesives. Many different adhesives, for example, "spin-on glass", can be used. "Spin-on glass" is a tetra-functional silicate such as $Si(OCH_3)_4$ in a volatile organic solvent such as methanol, which bonds readily and firmly to silicon and other silicates such as the optical fiber and has a very high melting or glass transition temperature. The silicate solution can be applied using batch processing techniques so that, when the solvent dries, ambient moisture hydrolyses the Si—O—CH$_3$ and forms a Si—O—Si inorganic glass. Other bonding techniques are described by W. H. Ko, et al., "Bonding Techniques for Microsensors," pp. 44–61 in C. D. Fung, P. W. Cheung, W. H. Ko, and D. G. Fleming, eds., *Micromachining and Micropackaging of Transducers*, (Elsevier Science Publication, Holland 1985); and K. E. Petersen, et al., "Silicon Fusion Bonding for Pressure Sensors," *IEEE Solid-State Sensor and Actuator Workshop*, Hilton Head SC, 144–147 (June 1988).

Several improvements in the basic design described above can be achieved. For example, the reflectivity of the mirror 16 and membrane 20 surfaces are crucial in the operation of the interferometric pressure sensor 10. Silicon is a semi-metal and is considerably reflective by itself; however, the optical and physical properties of the mirror 16 and membrane 20 surfaces can be modified using simple thin film, metal or dielectric depositions or other processing techniques such as thermal oxidation at the wafer level. By choosing the appropriate coating material, the reflectivity of the surfaces can be enhanced or diminished as the engineering design of the sensor requires. Thin film dielectric interference filters may also be utilized to restrict the reflections to a specific wavelength. If the sensor 10 is to be operated at temperatures in excess of 600° C., oxidation resistant coatings such as $Si_3N_4$ or $Al_2O_3$ may be added to prolong the sensor 10 lifetime and reduce thermal drift. Additional grooves, similar to the groove 22 formed to receive fiber 12, can also be added for thermocouples 32 or other temperature sensors to permit temperature compensation or produce a temperature/pressure multisensor.

Modifications and variations of the interferometric pressure sensor and method of fabrication thereof will be obvious to those skilled in the art from the foregoing detailed description of the invention. Such modifications and variations are intended to come within the scope of the appended claims.

We claim:
1. An interferometric pressure microtransducer comprising
    two layers of silicon of different crystal orientations and an optical waveguide formed between the two silicon layers,
    wherein one silicon layer includes a pressure-responsive, light-reflective membrane and the second silicon layer includes a light reflective surface oriented at an angle with respect to the membrane to convey light reflected by the light-reflective surface to the optical waveguide.
2. The interferometric pressure microtransucer of claim 1, wherein the light reflective surface is a substantially planar light reflective surface positioned to reflect light traveling normal to the membrane at a second angle, further comprising a means for transmitting and receiving light traveling at the second angle.
3. The interferometric pressure microtransducer of claim 1 wherein the optical waveguide is sealed by means of an adhesive between the first layer of silicon having a surface reflecting light through the optical waveguide and the second layer of silicon having a pressure-responsive membrane.
4. The interferometric pressure microtransducer of claim 1
    wherein the first silicon layer is a layer of {410} silicon having a first surface, a groove in the first surface and a second surface positioned to reflect along the groove light striking the second surface at an angle normal to the first surface;
    and the second silicon layer is a layer of {100} silicon bonded to the {410} silicon layer and having a pressure-responsive membrane, wherein the {410} and {100} layers are aligned so that light reflected by the membrane strikes the second surface of the {410} layer and is reflected along the groove, and the optical waveguide is an optic fiber positioned in the groove to transmit light to and from the second surface of the {410} layer.

5. The interferometric pressure microtransducer of claim 1 further comprising sensing means other than for pressure.

6. The interferometric pressure microtransducer of claim 1 further comprising grooves in at least one silicon layer for alignment of the light reflective surface with the pressure-responsive, light-reflective membrane.

7. The interferometric pressure microtransducer of claim 1 further comprising a layer formed of light-reflective or dielectric filter material on the light reflective surface or membrane.

8. The interferometric pressure microtransducer of claim 1 wherein the two silicon layers are bound together.

9. The interferometric pressure microtransducer of claim 8 wherein the two silicon layers are bound together using a bonding means selected from the group consisting of silicate adhesive, anodic bonding, and fusion bonding.

10. A method of producing an interferometric pressure microtransducer comprising the steps of:
   (a) providing a first and a second layer of silicon having different crystal orientations from each other,
   (b) forming a light-reflective surface and a groove in alignment with the light-reflective surface on the first layer of silicon,
   (c) forming a pressure-responsive membrane in the second layer of silicon, and
   (d) bonding the first and second layers of silicon so that light traveling along the groove toward the light-reflective surface is reflected by that surface and illuminates the membrane.

11. The method of claim 10 further comprising the step of inserting optical fiber light guiding means in the groove of the silicon layer of step (b).

12. The method of claim 10 for producing a plurality of interferometric pressure transducers comprising the steps of:
   (a) forming in the first layer of silicon having a first crystal orientation a plurality of light-reflective surfaces;
   (b) forming a groove in the first silicon layer surface aligned with each light reflective surface so that light traveling along each groove is reflected towards the light reflective surface it is aligned with,
   (c) forming a plurality of pressure-responsive membranes in the second layer of silicon having a second different crystal orientation,
   (d) joining the two layers of silicon to align the membranes with the light-reflective surfaces,
   (e) inserting an optical fiber in the groove of each transducer structure, and
   (f) dicing the joined silicon layers into pressure transducer structures.

13. The method of claim 12 further comprising the steps of forming wafer aligning structures in each of the wafers and utilizing the aligning structures to position the two wafers with respect to each other as desired during the step of joining the two wafers.

14. The method of claim 10 further comprising making the light reflective surfaces and membranes using selective anisotropic etching.

* * * * *